June 5, 1923.
G. F. SHEVLIN
1,457,941
COOLER FOR RECLAIMED LIQUOR AND GAS IN PAPER PULP PROCESSES
Filed Dec. 19, 1921    2 Sheets-Sheet 1
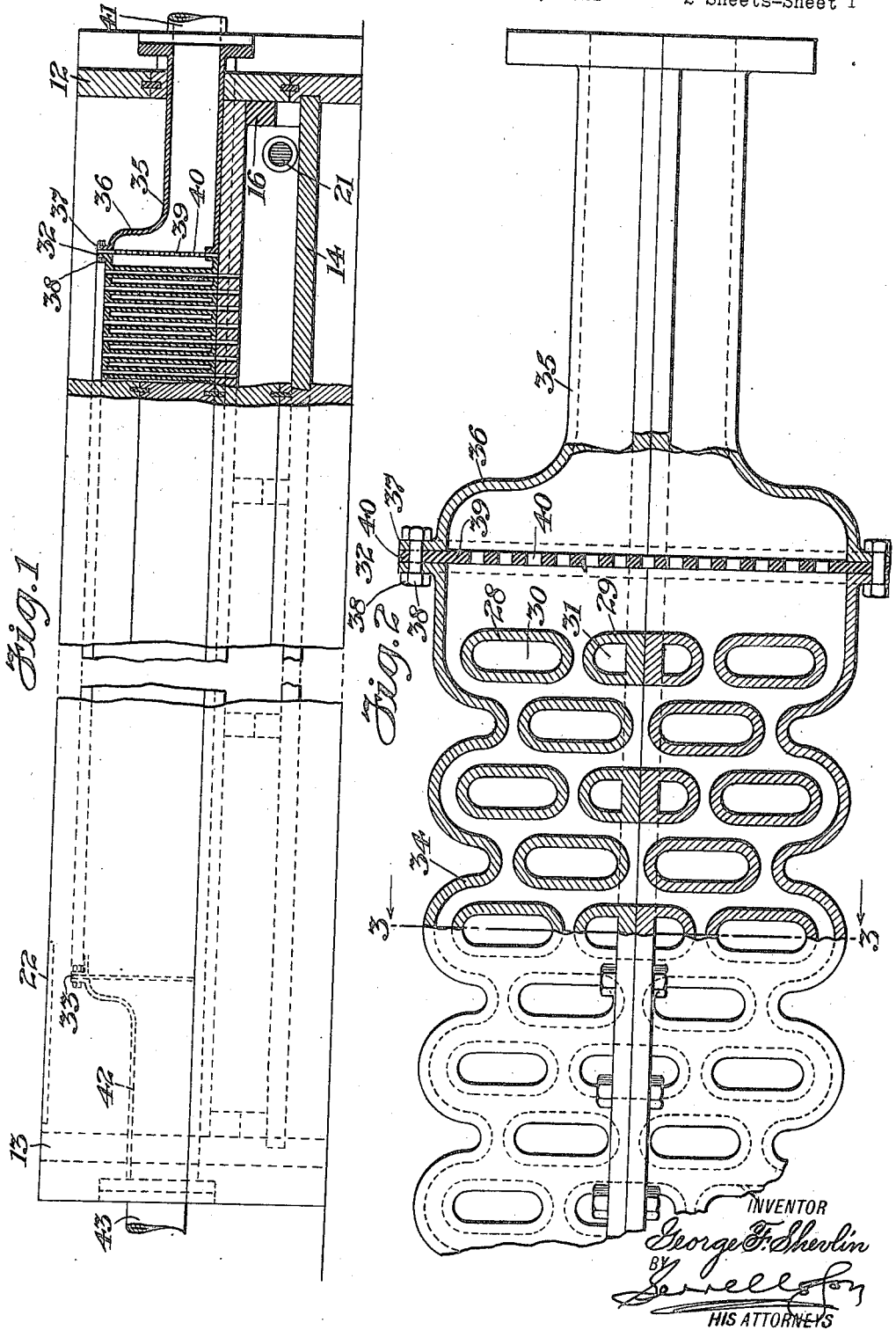

June 5, 1923.
G. F. SHEVLIN
1,457,941
COOLER FOR RECLAIMED LIQUOR AND GAS IN PAPER PULP PROCESSES
Filed Dec. 19, 1921    2 Sheets-Sheet 2
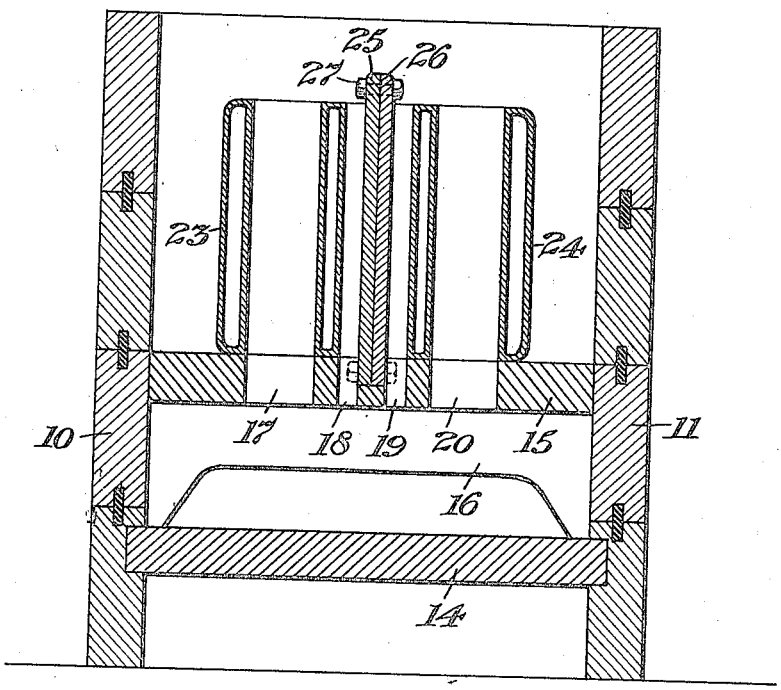
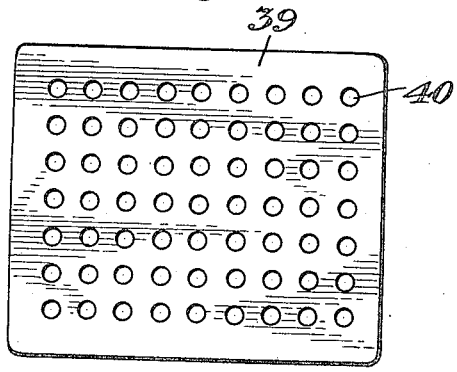
INVENTOR
George F. Shevlin
BY
HIS ATTORNEYS Patented June 5, 1923.

1,457,941

UNITED STATES PATENT OFFICE.

GEORGE F. SHEVLIN, OF GLENS FALLS, NEW YORK.

COOLER FOR RECLAIMED LIQUOR AND GAS IN PAPER-PULP PROCESSES.

Application filed December 19, 1921. Serial No. 523,292.

*To all whom it may concern:*

Be it known that I, GEORGE F. SHEVLIN, a citizen of the United States, residing at Glens Falls, in the county of Warren and State of New York, have invented an Improvement in Coolers for Reclaimed Liquor and Gas in Paper-Pulp Processes, of which the following is a specification.

In the manufacture of paper from wood and particularly in that portion of the process in which the pulp is treated in suitable digesters by the necessary gases and liquid, it is desirable to reclaim as much of the liquor as possible and to cool the same to approximately the temperature of the mill so that subsequently the liquor may be strengthened and reemployed in the digester. In the use of this liquor the gases escape at a predetermined temperature and in order to obviate this the acid and gas should be maintained wherever possible below this temperature. I am aware that heretofore in coolers of the nature to which this invention relates the liquor and gases have been cooled by being passed through a vessel provided with tubes for circulating water, the vessel being made of suitable metal which is not readily attacked by the acid. Irrespective, however, of the material of which this vessel is made I have found that the incoming liquor and gases have a tendency to attack the tubes which are first reached to a greater extent than those around which the liquor and gases subsequently pass, and in order to overcome this difficulty I employ in an apparatus of this type a suitable device such for example as a baffle plate placed between the inlet pipe and the vessel in such a manner that the incoming liquor and acids are caused to spread and fill the vessel and pass through or by the baffle plate before reaching the tubes which are nearest the inlet pipe so as to obviate as much as possible the attack which is made by the liquor and acids on these tubes thereby materially increasing the useful life of all the tubes which are employed in the vessel, and the particular construction of my present invention will be hereinafter more particularly described.

In the drawing:

Fig. 1 is a side elevation and partial section illustrating the cooling apparatus made in accordance with my invention.

Fig. 2 is a sectional plan on an enlarged scale showing the vessel forming part of the invention.

Fig. 3 is a section taken on line 3—3, Fig. 2, and

Fig. 4 is a plan of the baffle plate employed in the cooling vessel.

Referring to the drawing it will be seen that in carrying out the invention I employ a tank which is preferably rectangular and is made up of side walls 10 and 11, end walls 12 and 13 and a bottom 14, the walls as indicated being preferably made in sections which are suitably united. Within the tank and spaced from the bottom wall 14 is a transverse wall 15. As indicated this is supported by the arches or bridges 16 placed in suitably spaced positions and in which there are openings indicated at 17, 18, 19 and 20. In a suitable position in a wall of the tank there is an inlet 21 for the circulating water or other medium, and also in a suitable position preferably oppositely disposed to the inlet is an overflow or outlet 22.

Within this tank I employ a vessel which is preferably made in parts and of any suitable material not readily attacked by the acid liquor. As illustrated this vessel is made in two parts illustrated at 23 and 24. These are similarly constructed and adapted to be secured to one another to form the vessel for receiving the liquor and acid to be cooled. The section 23 is provided with a flange 25 and the section 24 with a similar flange 26, which flanges are connected by bolts 27 or otherwise to secure the parts of the vessel together and to complete the chamber in which the liquor and acids are received and through which they are caused to flow during the cooling operation. In this vessel there are series of tubes or pipes indicated at 28 and 29. These are preferably elongated and are open at the top and the bottom of the vessel providing passages 30 and 31 respectively which extend entirely through the vessel from the bottom to the top thereof so as to permit the circulating water or other medium to flow upwardly through these tubes in order to absorb the heat transmitted to the tubes by the liquor and gases and thereby cool the liquor and gases as the same pass through the vessel.

At the ends of the vessel the parts thereof are provided with flanges 32 and 33 and the sides of the vessel are preferably corrugated as indicated at 34 so as to increase as far as possible the surface brought into contact with the circulating medium. The flange 32 at one end of the vessel which as indicated is the receiving end is connected to an intake pipe 35. The adjacent end of this pipe is flared as indicated at 36 and flanged as indicated at 37 to correspond in outline with the end of the vessel when the parts are connected so that the flanges 32 and 37 may be connected by suitable bolts 38 or otherwise with a baffle 39 intervening between the flanges. In this baffle there are apertures or perforations indicated at 40 through which the liquor and acids are caused to pass before they reach the nearest adjacent tubes in the cooling vessel. It will be apparent from the position of this baffle as clearly indicated in Figs. 1 and 2 the liquor and acids after passing through the intake pipe 35 are permitted to spread and the rate of the flow of the same is thereby correspondingly decreased before the same pass through the baffle into the main chamber of the vessel and consequently this action takes place before the liquor and acids come into contact with these tubes. As hereinbefore stated I have found that this employment of the baffle plate as described materially decreases the attacking action of the liquor and acids and thereby increases the useful life of the tubes extending through the vessel.

The liquor and acids from the digesters are conveyed from the digesters through the pipe 41 which is connected to the intake pipe 35. At the opposite end of the vessel and also lying within the tank there is an outlet pipe 42 similar in all respects to the intake pipe and connected to the parts of the vessel in the same manner with the exception of the omission of the baffle plate which it is not necessary to employ at this end of the apparatus except in instances where as is possible the piping is such as to provide for a reversal of the direction of the flow through the vessel. This outlet pipe is connected to a discharge pipe 43 through which the cooled liquor and acids are conveyed to a suitable tank or other place to be strengthened if necessary and to be ready for re-use in the digesters.

I claim as my invention:

1. A cooler for reclaiming liquor and gases in paper pulp processes comprising a tank, a vessel having a plurality of tubes extending therethrough, an inlet pipe, and means between the inlet pipe and the tubes in the vessel for preventing the liquor and gases from coming into direct contact with the said tubes upon entering the said vessel.

2. A cooler for reclaiming liquor and gases in paper pulp processes comprising a tank, an inlet pipe for the liquor and gas extending through a wall of the tank, a vessel, the capacity of which is large relatively to that of the inlet pipe so that the liquor and gas are retarded upon entering the vessel, a plurality of tubes extending through the said vessel, and a baffle plate secured in position between the said inlet pipe and the tubes of the vessel for preventing the gas and liquor from coming directly into contact with the said tubes when first entering the said vessel.

3. A cooler for reclaiming liquor and gases in paper pulp processes comprising a tank, an inlet pipe extending through a wall of the said tank and having an enlarged end therein, a vessel placed in the said tank and conforming to the flared end of the said inlet pipe, a plurality of tubes extending through the said vessel from the bottom to the top thereof, and a baffle plate having holes therein secured in position between the flared end of the inlet pipe and the adjacent end of the said vessel.

Signed by me this 13th day of December, 1921.

GEO. F. SHEVLIN.